United States Patent [19]

Wall

[11] 4,416,488
[45] Nov. 22, 1983

[54] ARM REST FOR A VEHICLE SEAT

[75] Inventor: Helmut Wall, Kirchheim-Teck, Fed. Rep. of Germany

[73] Assignee: Keiper Recaro GmbH, Fed. Rep. of Germany

[21] Appl. No.: 244,675

[22] Filed: Mar. 17, 1981

[30] Foreign Application Priority Data

Apr. 2, 1980 [DE] Fed. Rep. of Germany ... 8009110[U]

[51] Int. Cl.³ .............................................. A47C 7/54
[52] U.S. Cl. .................................. 297/411; 248/118; 297/194
[58] Field of Search ....................... 297/194, 411, 330; 292/86; 339/128; 248/118; D8/402

[56] References Cited

U.S. PATENT DOCUMENTS

| 1,700,337 | 1/1929 | Renner | 297/194 X |
|---|---|---|---|
| 1,953,037 | 3/1934 | Ash | 206/1.5 |
| 2,376,117 | 5/1945 | Bright et al. | D8/402 X |
| 2,705,787 | 4/1955 | Benander | 339/95 D |
| 2,736,320 | 2/1956 | Roberts | 297/194 X |
| 3,173,720 | 3/1965 | Noda | 297/330 X |
| 3,568,827 | 3/1971 | Schwabensted | 292/86 |
| 3,588,170 | 6/1970 | Knabusch et al. | 297/330 |
| 4,099,780 | 7/1978 | Schmidhuber | 297/411 |
| 4,190,284 | 2/1980 | Schmidhuber et al. | 297/194 |
| 4,200,166 | 4/1980 | Hansen | 297/411 |
| 4,209,150 | 6/1980 | Stephenson | D8/402 X |

FOREIGN PATENT DOCUMENTS

| 559424 | 10/1957 | Belgium | 297/411 |
|---|---|---|---|
| 28885 | 11/1921 | Denmark | 292/86 |

Primary Examiner—James T. McCall
Attorney, Agent, or Firm—Wigman & Cohen

[57] ABSTRACT

An arm rest for a vehicle seat which includes means for removably receiving a control device therein. A portion of the arm which supports the control device is in the form of an inwardly projecting tongue which can be downwardly flexed and will permit release of the control device for removal from the arm rest.

4 Claims, 5 Drawing Figures

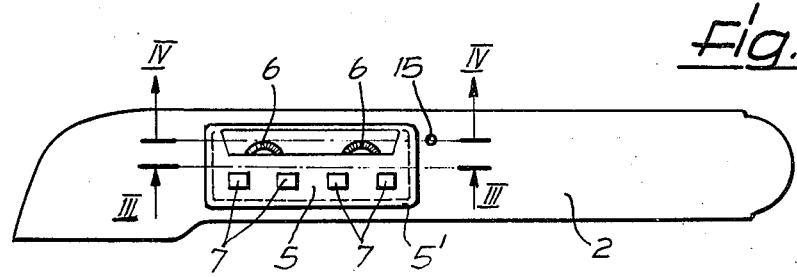
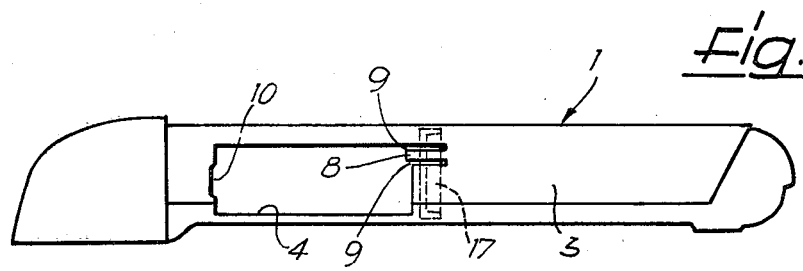
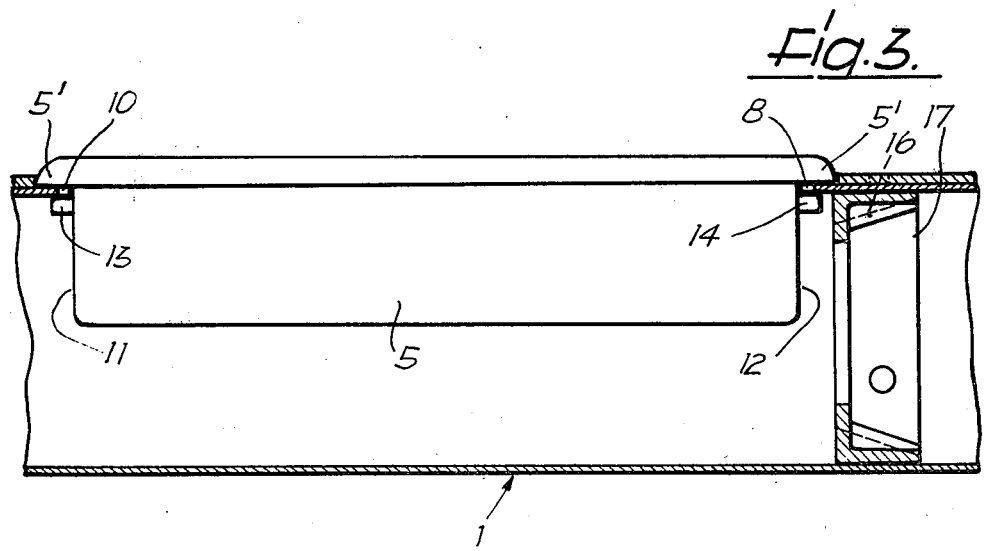

ARM REST FOR A VEHICLE SEAT

BACKGROUND OF THE INVENTION

The invention relates to an arm rest for a vehicle seat, particularly an airplane passenger seat or omnibus seat, having a hollow support which includes an opening in one of its walls in which opening is placed a control device which is detachably connected with the support.

In conventional arm rests of this type, screws are provided for the detachable connection of the control device, which is also known as a PCU. The wall of the support is very thin for weight reasons and for the same reason is usually made of aluminum sheet; hence, screws cannot be screwed directly into the wall. Threaded bushings are therefore provided to receive the screws. The bushings are placed in a plastic frame attached to the interior of the support in a position directed toward the opening. This makes mounting difficult, in that the frame cannot be passed through the opening into the interior of the support. The expense associated with connecting the control device with the support and for mounting the control device is therefore relatively high. Further disadvantages are that the screws can become loose and that the screw heads are exposed.

OBJECT AND SUMMARY OF THE INVENTION

Accordingly, the object of the present invention is to improve the arm rest of the above-described type such that the expense associated with the placement of the control device, as well as mounting and removal, is decreased. This object is achieved with an arm rest in which a portion of the material of the control device on opposite sides thereof wraps around the edge of the opening when in its in-use position and in which an elastic tongue is provided on the wall with the opening, the free end of which extends toward one of the two side surfaces carrying the portions of material which wrap around the edge of the opening. From its locking position, where the free end holds the control device in a position in the opening where both material portions wrap around the edge of the opening, the elastic tongue can be moved into a release position, where it allows the control device to be moved toward the free end of the tongue into a position where the material portion on the side surface opposite the tongue is disengaged with the edge of the opening.

Since the control device is connected to the wall of the support with the opening by means of the material portions which wrap around the edge of the opening, neither screws nor a frame with threaded bushings are necessary. In order to place the control device into the opening from the outside, the elastic tongue is readily moved out of the way far enough such that the side surface of the control device facing the free tongue end can be moved far enough toward the edge of the opening facing this side surface to provide sufficient space between the opposite side surface and the edge of the opening facing it to allow the material portion projecting therefrom to be introduced into the opening. As this is done the material portion provided on the side surface facing said tongue end is already wrapped around the edge of the opening it faces. The control device is then pushed toward the opposite edge until the material portion on the other side wraps around this opposite edge. The other material portion projects over the side surface supporting it so that even after this shifting it still wraps around the edge of the opening. The elastic tongue is then released and thus forms a stop for the side surface of the control device facing it. This prevents the control device from moving back toward the free tongue end so far that the material portion on the opposite side surface comes out of engagement with the edge of the opening.

The elastic tongue can be a separate element which, for example, is riveted to the wall of the support. In a preferred embodiment, however, the tongue is formed in one piece with the wall which includes the opening. It can then be formed by two cuts as the opening is punched out, which is particularly economical.

If the opening is rectangular, which is preferred, it is advantageous for the tongue to lie parallel to the longitudinal sides of the opening and for its free end to project beyond one of the narrow sides into the space of the opening.

To detract as little as possible from the optimal appearance of the arm rest, only a very small hole is preferably provided in the cover over the tongue for the activation thereof. A pin or the like can be inserted through this hole to deflect the tongue. Since the person who is doing the mounting cannot see the degree to which the tongue is deflected, it is important to provide a stop for the tongue which restricts the range of the deflection. This is particularly important when the tongue is made from the same material as the support of the arm rest. Such a stop can be formed, for example, by a stiffening body arranged generally in the interior of the support to stiffen same.

The invention is described in greater detail below with the aid of an exemplary embodiment which is illustrated in the drawing.

BRIEF DESCRIPTION OF THE DRAWINGS

FIG. 1 is a side view of the arm rest with the control device in place;

FIG. 2 is a side view of the support of the arm rest;

FIG. 3 is a section taken along the line III—III of FIG. 1;

DETAILED DESCRIPTION OF A PREFERRED EMBODIMENT

Figure 4:
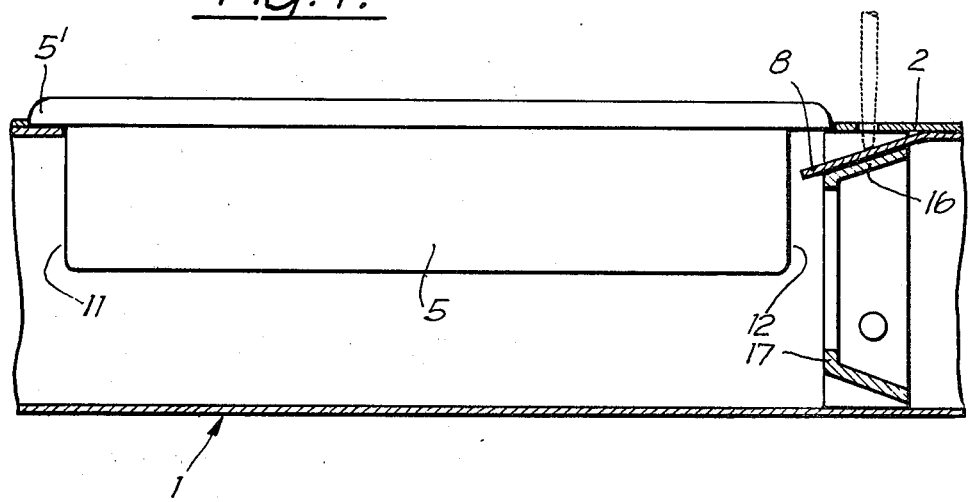
FIG. 4 is a section taken along line IV—IV of FIG. 1.

Referring now to the drawings like reference numbers are used for like elements throughout the several views. As shown in FIG. 1, an arm rest for an airplane passenger seat or an omnibus seat includes a hollow, box-like support, at least the central portion of which has a rectangular cross section. The sheets forming the walls of the support are very thin, e.g., having a thickness of 0.5 mm. and are formed from an aluminum alloy. A plastic covering 2 covers the support 1.

A generally rectangular opening 4 (FIG. 2) is formed in the inner side wall 3 of the support 1, and extends in the longitudinal direction of the support 1. A control device 5 which is generally designated as a PCU is placed in this opening 4. This control device 5 has a plastic housing, the shape of which corresponds with the cross-sectional shape of the opening 4. However, on the front side thereof supporting the dials 6 and the switches 7, the control device 5 has a peripheral edge 5' which projects laterally from the sides and which forms the contact surface for the control device when in place. The opening 4 can also be provided at another location of the support, as for example on the top thereof.

Since the control device 5 is placed in the arm rest after the cover 2 has been attached to the support 1, the cover is provided with an opening which is aligned with the opening 4.

As shown in FIG. 2, at one of the narrow sides the free end of an elastic tongue 8 projects into the opening 4 of the support 1. This tongue 8, which lies parallel to the long sides of the opening 4, is formed in one piece with the side wall 3 and is exposed at its two long sides by respective slits 9 formed during the punching out of the opening 4. The upper slit 9 lies as an extension of one long side of the opening 4. The distance between the two slits 9 and hence the width of the tongue 8, is selected such that the tongue 8 projects into the opening 4 by less than half of the narrow side.

The center portion of the narrow side of the opening 4 opposite the tongue 8 is recessed, thus providing this narrow side with a type of groove 10.

A projecting ledge 13, 14 (FIG. 3) is formed on the opposite side surfaces 11 and 12, respectively, which form the two narrow sides. These ledges 13, 14 extend parallelly to the edge 5' forming the contact surface, and namely at such a distance therefrom as to assure that the control device 5 is connected with the arm rest without any play when the peripheral edge 5' overlaps the cover 2 and the ledges 13 and 14 engage behind the edge of the opening 4 in the side wall 3.

Figure 5:
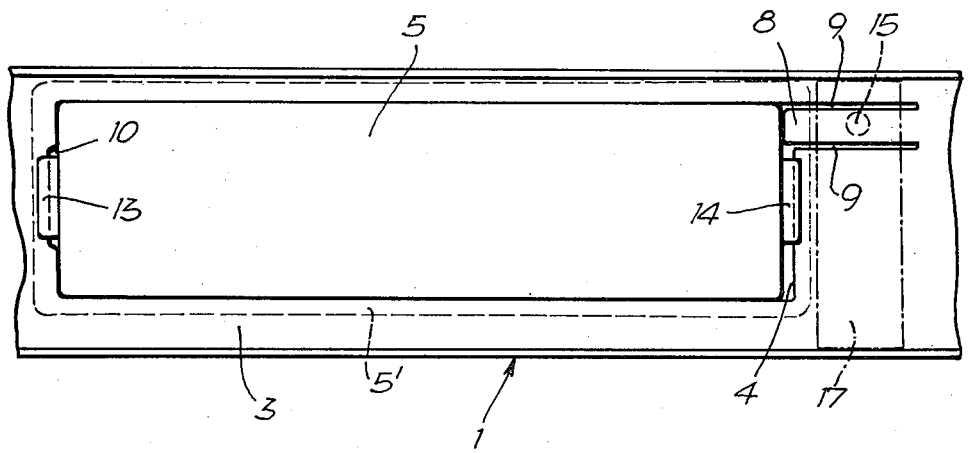
FIG. 5 is a top view of the interior of the wall of the support carrying the control device as well as the bottom of the control device.

As best seen in FIG. 5, the ledge 13 is directed toward the groove 10 and is somewhat narrower than said groove 10. The ledge 14, is provided on the opposite side surface, disposed such that it is displaced relative to the elastic tongue 8 to such an extent that it engages behind the edge of the opening 4 adjacent the tongue 8. The overlap of the ledge 14 beyond the side surface of the control device 5 supporting it is sufficiently large so that it engages behind the edge of the opening 4 even when the opposite side wall abuts the edge of the opening 4 thereto. The control device 5 is thusly held in this position by the elastic tongue 8, the free end of which, when in its non-deflected, locking position, forms a stop for the side surface carrying the ledge 14. This stop either abuts this side surface or has a very slight spacing therefrom. If, however, the elastic tongue 8 is deflected into the interior of the support 1, then the control device 5 can be moved so far toward the tongue 8, i.e., to the right, as viewed in FIG. 5, that the ledge 13 is free to pass through the groove 10. In this position the control device 5 can be removed from the opening 4, first from the side of the ledge 13 and then after a certain movement, from the side of the ledge 14.

Mounting the device is just as simple. First the side of the control device 5 carrying the ledge 14 is introduced into the opening 4 as the tongue 8 is deflected. Then the side surface carrying the ledge 14 is pushed toward the tongue 8, i.e., to the right, as viewed in FIG. 5, whereby the edge 14 becomes engaged behind the edge of the opening 4, and the ledge 13 can pass through the groove 10. The control device 5 is then pushed toward the side of the opening 4 with the groove 10 until the ledge 13 engages behind the edge of the opening. During this movement the tongue 8 can spring back from its release position into the locking position.

To deflect the elastic tongue 8 into the release position from outside, a small hole 15 is provided in the cover 2 so as to be positioned above the tongue 8. A pin or the like shown in dotted lines in FIG. 4 can be inserted through this hole 15.

To limit the deflection of the tongue 8 to the desired extent and also prevent an overextension of the tongue, the angle to which the tongue 8 can be deflected is limited by providing canted surface 16 on a frame-like plastic rib 17. Rib 17 is disposed within the support to rigidify same and abuts the insides of the walls of the support. The outer surface of rib 17 facing the side wall 3 is provided with a groove-like recess in the area directed toward the tongue 8, whereby the bottom of the groove is formed by the canted surface 16, whose angle of inclination corresponds to the maximum deflection of the tongue 8.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. Arm rest for a vehicle seat, such as an airplane passenger seat or a bus seat, comprising:
    a hollow support including an opening in one side wall;
    a control device which is constructed to be received within said opening of said side wall of said support;
    said control device having extended portions disposed on opposite sides thereof which engage the narrow edges of said opening and extend beyond said opening;
    a flexible tongue connected to said side wall, the free end of said tongue extending toward one side of said control device to prevent lateral shifting of said control device when in a locking position, said tongue being deflected out of said locking position into a release position where shifting of said control device toward said tongue is allowed;
    a stop means for limiting the degree to which said tongue can be deflected into the interior of said support;
    a stiffening body arranged within said support, said stop means being formed by a surface of said stiffening body;
    said surface being canted to correspond to the maximum deflection position of said tongue;
    whereby said extended portion of said control device opposite said tongue can be disengaged from the edge of said opening.

2. The arm rest according to claim 1, wherein said tongue is made of one-piece from the material of the wall forming said opening.

3. The arm rest according to claim 1, wherein said opening is generally rectangular, and said tongue lies parallel to one long side of said opening, the free end thereof projecting into said opening.

4. The arm rest according to claim 1, further comprising a cover on said support which covers said tongue, said cover including a hole located above said tongue, for receiving a rod therein which can deflect said tongue.

* * * * *